United States Patent [19]

Fleming et al.

[11] Patent Number: 4,823,929

[45] Date of Patent: Apr. 25, 1989

[54] MULTI-STATION ASSEMBLY MACHINE

[75] Inventors: Marc A. Fleming, Cardiff; LaMonte D. Porter, San Marcos, both of Calif.

[73] Assignee: Hunter Industries, San Marcos, Calif.

[21] Appl. No.: 150,987

[22] Filed: Feb. 1, 1988

[51] Int. Cl.⁴ .............................................. B65G 47/22
[52] U.S. Cl. ..................................... 198/345; 198/493
[58] Field of Search ...................... 198/345, 346.1, 493; 414/222

[56] References Cited

U.S. PATENT DOCUMENTS

| | | | |
|---|---|---|---|
| 3,527,087 | 9/1970 | Converse, III et al. | 198/345 X |
| 3,741,370 | 6/1973 | Hostetler | 198/493 |
| 4,371,075 | 2/1983 | Erlichman | 198/345 |
| 4,479,572 | 10/1984 | Merz | 198/345 |
| 4,718,533 | 1/1988 | Nussbaumer et al. | 198/346.1 |

FOREIGN PATENT DOCUMENTS

| | | | |
|---|---|---|---|
| 5283 | 1/1980 | Japan | 198/345 |
| 1401459 | 7/1975 | United Kingdom | 198/345 |

Primary Examiner—P. W. Echols
Assistant Examiner—Andrew E. Rawlins
Attorney, Agent, or Firm—Baker, Maxham, Jester & Meador

[57] ABSTRACT

A modular assembly line apparatus for automatically assembling multiple component devices, such as sprinkler units and the like, includes a central support table including upper and lower reference rails for mounting assembly fixtures and mechanisms, high and low pressure air manifolds built into the table, a conveyer for continuously moving support pallets along the table, and multiple station pallet stop and support fixtures for selectively stopping and supporting work pieces for assembly functions.

20 Claims, 4 Drawing Sheets

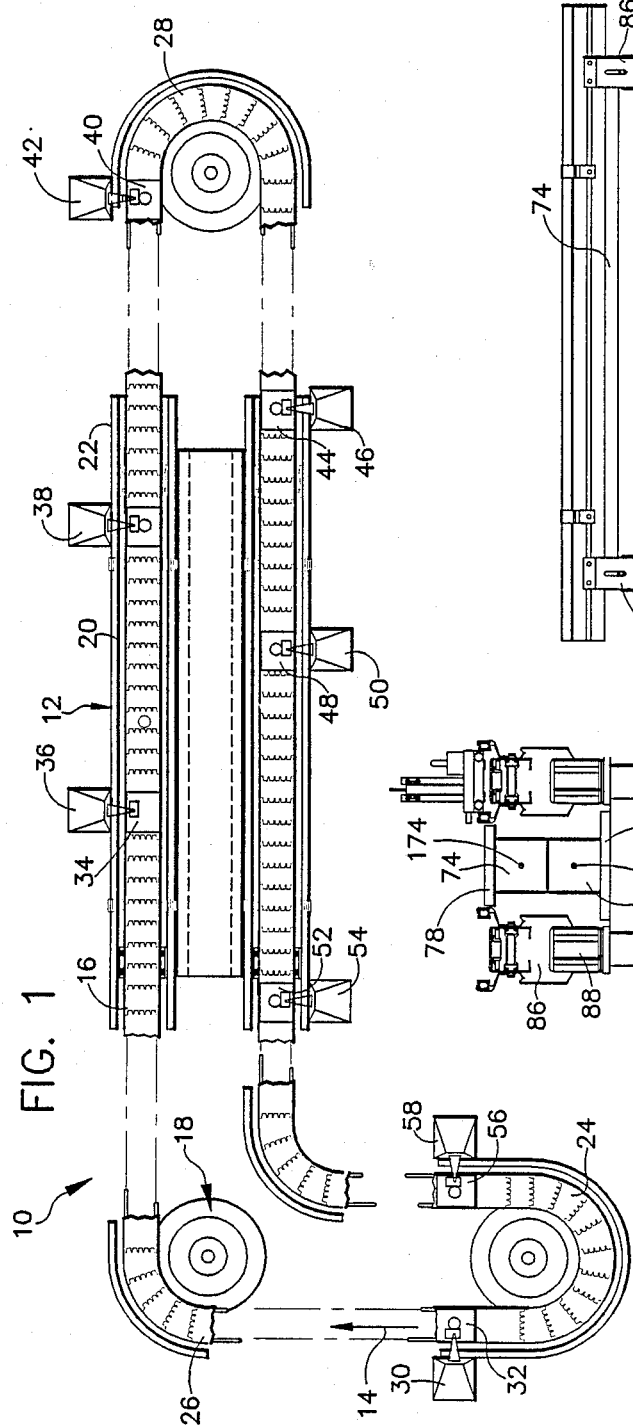
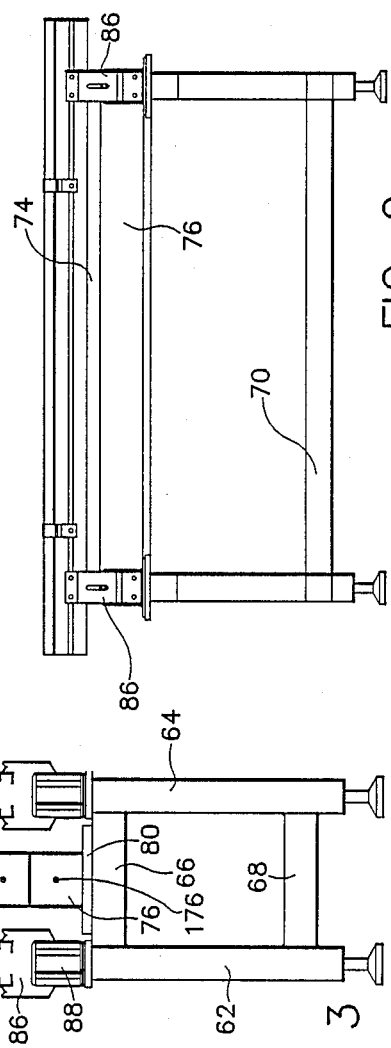

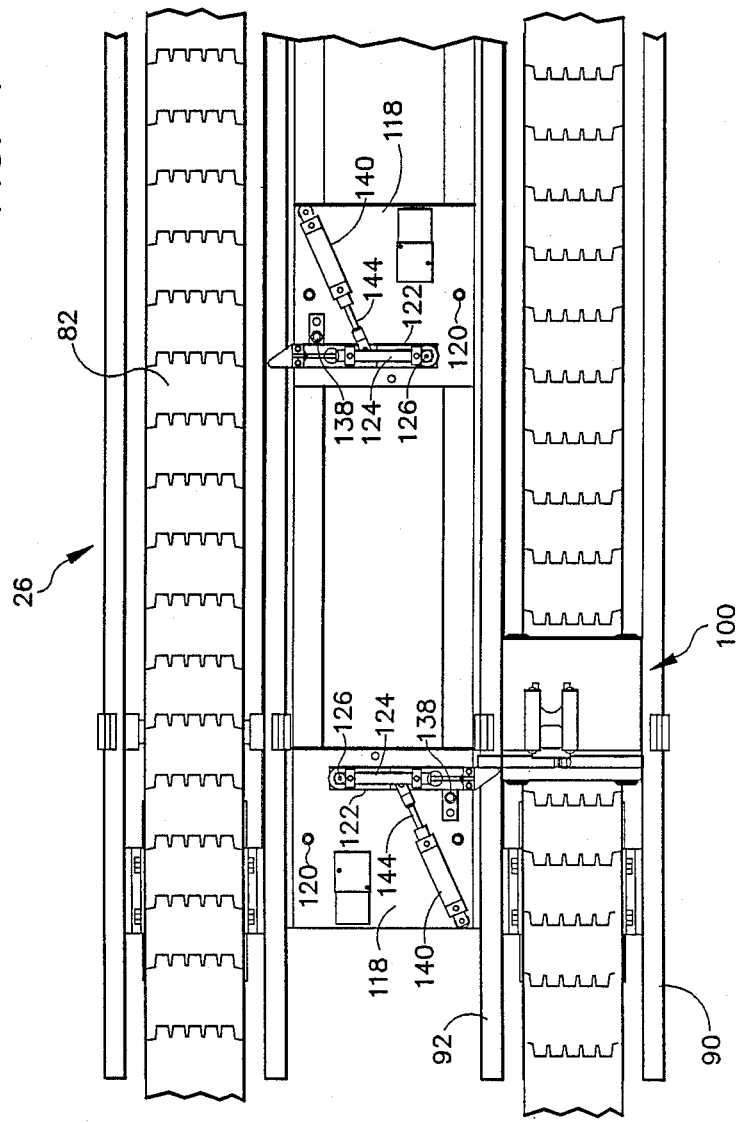

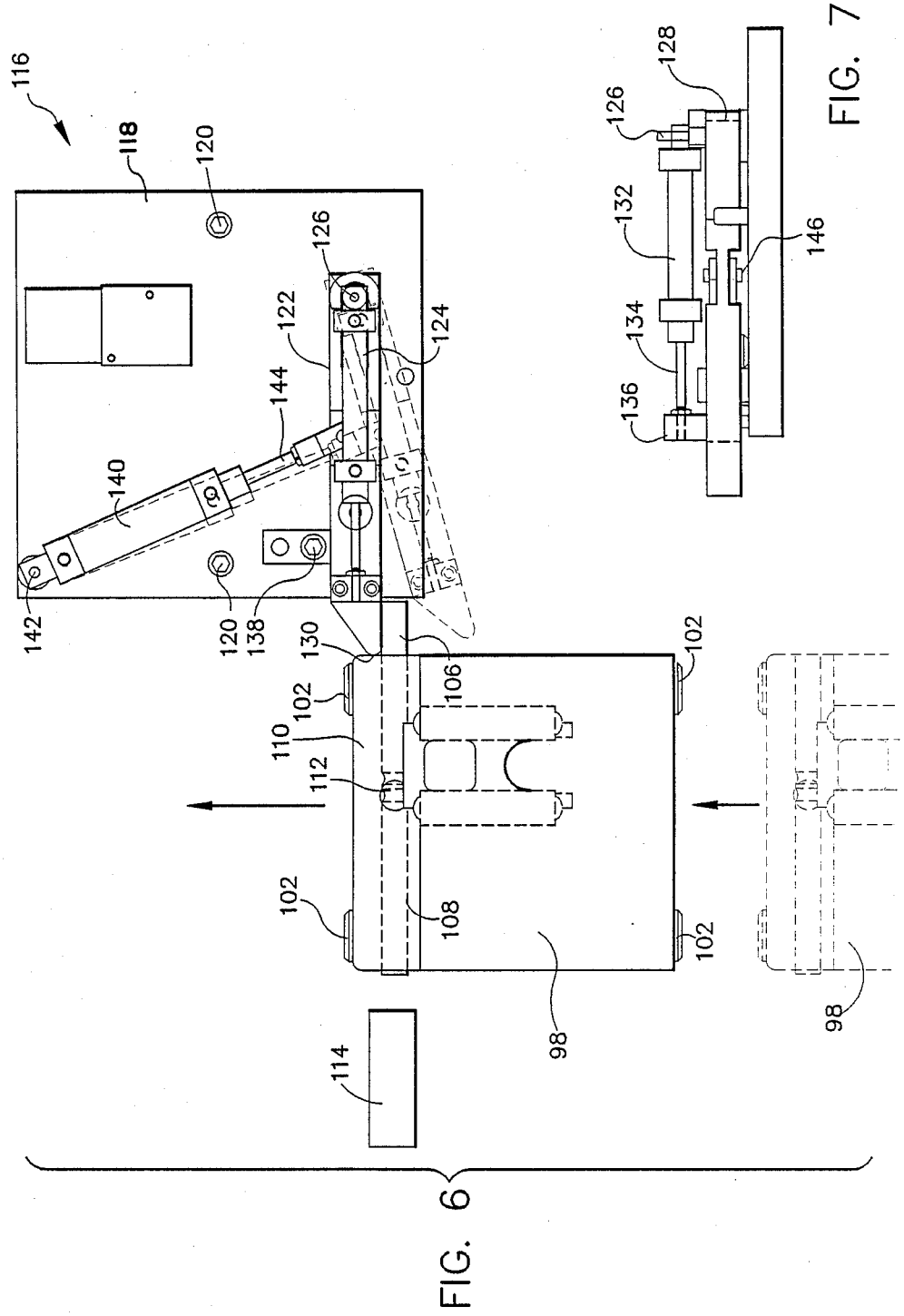

MULTI-STATION ASSEMBLY MACHINE

BACKGROUND OF THE INVENTION

The present invention relates to assembly line manufacturing, and pertains particularly to a modular assembly unit for setting up an assembly line system having multiple stations for multiple assembly functions.

Multi-station assembly apparatus for the assembling of various devices have been known heretofore. These assembly apparatus however have been typically custom constructed for assembling a particular device or apparatus, or at most minor variations in devices.

It is desirable that modular assembly apparatus be available that can be adapted to the formation of any number and length of assembly lines with any number of assembly stations to perform a wide variety of assembly operations and capable of assembling a wide variety of devices.

SUMMARY AND OBJECTS OF THE INVENTION

It is the primary object of the present invention to provide an improved modular assembly apparatus.

BRIEF DESCRIPTION OF THE DRAWING

The above and other objects and advantages of the present invention will become apparent from the following description when read in conjunction with the accompanying drawing wherein:.

FIG. 1 is a top plan view of an assembly apparatus embodying the invention;

FIG. 2 is a side elevation view of a modular unit in accordance with the invention;

FIG. 3 is an end elevation view of the unit of FIG. 2;

FIG. 4 is an enlarged top view of the modular unit of FIG. 2;

FIG. 6 is an enlarged view of a stop mechanism and a pallet; and

FIG. 7 is a side elevation view of the pallet of FIG. 6.

DETAILED DESCRIPTION OF A PREFERRED EMBODIMENT

Figure 5:
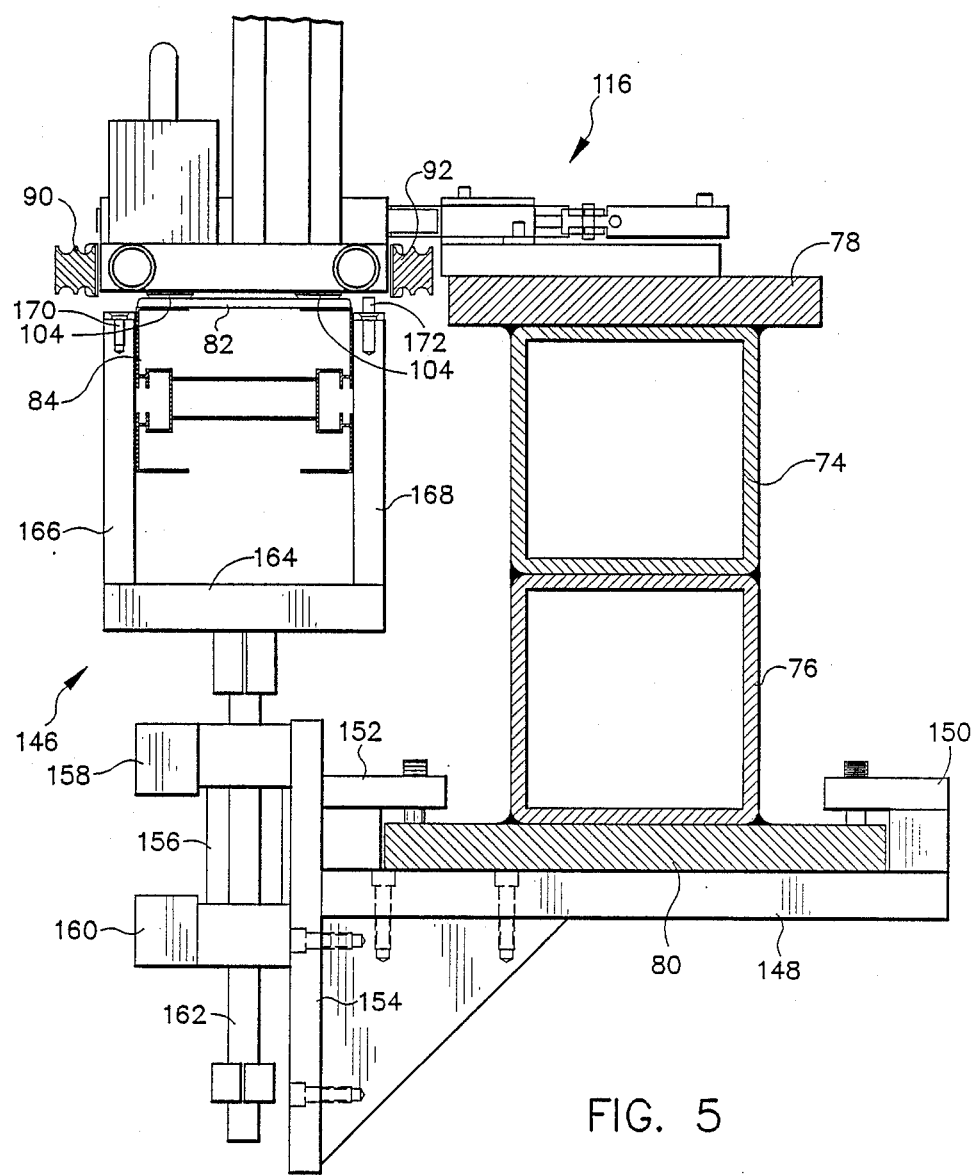
FIG. 5 is an enlarged section view taken through the support and manifold structure adjacent a typical station.

Referring to FIG. 1 of the drawing, there is schematically illustrated a manufacturing assembly line for the automatic assembly of an article of manufacture. The assembly line or assembly system designated generally by the numeral 10 incorporates a plurality of modular units, which are substantially identical, designated generally by the numeral 12, which combine to make up a selected assembly line or system The modular units, as will be more fully described, are designed to be put together to form an assembly line apparatus and may constitute one or any number of modular units that form a complete assembly line for manufacturing of any one of a number of selected products. As illustrated in the exemplary system, the modular units are put together end to end with a unit 14 interconnected to an adjacent unit 16 at right angles thereto, with a corner or transition unit 18 connected therebetween. A further pair of units 20 and 22 are positioned end to end and form a generally elongated L-shaped assembly line. As will be appreciated, the assembly line can be formed from one or any number of modular units and into any number of different configurations as desired.

The exemplary system 10, as illustrated in FIG. 1, provides an assembly line that begins and terminates with the unit 14, which has an end unit 24 for providing for the continuous running of a conveyer along both sides of each unit of the entire system. A similar unit 28 on the end of unit 22 enables the conveyer unit 26 to continue in a continuous endless path around the entire assembly line.

In the illustrated embodiment, unit 14 is the start and end of the system, with for example a first supply source 30 of one component of the article of manufacture delivered to a first work station 32, where the first component part of the article is mounted on a fixture on a pad or pallet that is supported for movement along the conveyer 26. As the pallet moves along the assembly line on the conveyer to a next station 34, another part is supplied and added to the article from a source 36. The pallet then continues along the conveyer to a third assembly station 38 from at which an additional part is supplied from source 38. The pallet then continues to a next station 40 for the addition of at least another part from a source 42. Similarly, the pallet continues around the conveyer to a subsequent station 44 where a part is again supplied from an additional source 46. The article continues to additional stations 48 for supply of part from source 50 and station 52, which is for example a final assembly station for the supplying of the final part at station 54. A final testing and culling station 56 may test the article and either reject the article or direct it to a packaging bin 58 for packaging and shipping.

The present system is designed to be built up of any number of modular units to accommodate as many stations as necessary, and to be arranged in any desired geometric configuration to fit required space or to cooperate with existing assembly line or supply stations Referring to FIG. 2 of the drawing, a basic modular unit is illustrated. The basic modular unit comprises a support structure illustrated somewhat in the form of a table or bench. This modular unit comprises generally an upstanding support structure having a pair of vertical support leg units at each end thereof. Each leg unit comprises a pair of vertically extending support legs 62 and 64 connected together by top and bottom cross members 66 and 68. Each leg has an adjustable foot constructed in a known manner.

A longitudinal lower beam 70 extends and is connected between lower cross members 68. A pair of upper longitudinal beams 74 and 76, which in the illustrated embodiment comprises a pair of elongated square cross sectioned tubular members stacked one above the other, forms the upper longitudinal beams of the structure. Upper and lower rails for mounting of assembly apparatus and the like are provided by upper and lower plates 78 and 80, which extend in width outward at the sides beyond the width of the two tubular beam members 74 and 76. The beam members are preferably secured together and between the plates 78 and 80 as by welding. The upper plate 78 forms a combination of a support table and laterally extending mounting rails for the mounting of assembly devices and mechanisms, as seen in FIGS. 3–5. The relative spacing between the upper and lower rails and the laterally spaced edges of the rails are maintained in order to provide a precise reference point from which the assembly mechanisms are mounted for forming the assembly functions.

The upper and lower tubular beams 74 and 76 perform additional functions as that of fluid chambers or reservoirs for containing pressurized air or gas. These chambers or reservoirs provide pressure source at a desired PSI, such as thirty PSI and eighty PSI, respectively. Normal positioning mechanisms can be operated from the thirty PSI source, for example with certain assembly operations operated from the eighty PSI source. These tubular members serve as reservoirs and manifolds for the connection of various assembly mechanisms which are operated thereby. The conveyer system comprises a conveyer belt 26 of a generally known construction, such as for example a plurality of interconnected pad members 82, pivotally or hingedly connected together to be articulated in the manner of a chain, and move around the periphery of the overall system. The conveyer belt 26 is mounted on an elongated box beam track member 84 on each side of the support table. The track member is mounted by suitable bracket units 86 and 88 adjacent the top rail and table member 78 at a position slightly below the upper surface thereof. The conveyer unit is of an off the shelf known construction. A pair of retaining rails 90 and 92 extend along each side of the conveyer belt 26 to aid in retaining pallets and the like on the conveyer. The end units of the conveyer each include a sprocket 94 and 96 which are rotatably mounted in suitable supports not shown, and at least one of which is driven by a motor not shown.

The conveyer belt 26 frictionally carries a plurality of pallets 100, as illustrated in FIG. 4, which are constructed to fit the conveyer and are designed to receive mounting fixtures for the manufacture of an article. The present system was designed particularly for the assembly of pop-up sprinkler units wherein multiple components are assembled to form the ultimate sprinkler unit. The pallets 100 are preferably rather precision formed support members, such as flat rectangular plates of a lightweight material such as aluminum or the like. A plurality of disc-like pads 102 are mounted on the front and rear of the pallet for providing engagement between adjacent pallets. A plurality of like pads 104 are mounted on the under side of the pallets for support of the pallets. The pallets may have one or more sensing devices mounted thereon, and may also have locating devices, such as precision positioned bores or the like, for receiving positioning mechanisms and the like. An indicator in the form of an elongated rod 106 mounted in a bore 108 of a block 110 on the pallet is positionable in selected positions to indicate a certain condition of the pallet. A detent assembly, such as a spring biased ball and multiple grooves 112, positions the indicator rod 106. Sensing means 114 senses the position of the indicator rod and either lets the pallet go by or stops it for the performance of an assembly operation. The sensor may take any suitable form, such as magnetic, light beam, etc.

A selector mechanism 116 for stopping the pallets at each assembly or operation station is illustrated for example in FIG. 5, and comprises generally a base plate with selective decelerating and stopping mechanism thereon. The stopping mechanism comprises a base plate 118 of a generally square or rectangular configuration, having means such as bolts or screws 120 for mounting on the support table 78 in a precise location for locating an assembly station. The mechanism comprises a first arm 122 that is of a generally elongated rectangular bar configuration having a slot 124 in one end for receiving a pivot mount or pin 126 and slide bearing, and a tapered and rounded opposite end 130 for engaging and stopping selected pallets. The arm 122 is extended and retracted by an air cylinder 132 pivotally mounted on the pin 126 at one end, and connected at the connecting rod 134 to bracket 136 on the arm 122.

An air spring comprising an air cylinder 140 pivotally mounted by a pin 142 at one end to the base plate 118, and including an air piston mounted therein, and including a rod 144 extending from the opposite end of the tubular cylinder, and connected at a pivot mounting 146 to the first arm biases the first arm to an angled position (shown in phantom) relative to the plate. This angle position is advanced relative to the position of the plate, such that the arm is engaged by the arriving pallet and pivots toward a stop against the air spring and stop block or unit 138 as the pallet decelerates and moves to the assembly station. The sensing unit 114 at the station functions to determine if an assembly function is to be performed on the part on the pallet, such that if no function is to be performed, the stop arm assembly releases the pallet 98 and permits it to continue to the next station.

If the sensing mechanism senses that an operation is to be performed on the part carried by the pallet, a positioning mechanism, as illustrated in FIG. 5, is actuated to selectively position the pallet and fixture mounted thereon at the work station for performing an assembly or other function.

Referring specifically to FIG. 5, there is illustrated a positioning mechanism (designated generally by the numeral 145) for selectively positioning pallets at work stations for performing manufacturing functions. The positioning mechanism functions to lift the pallet 98 from the surface of the conveyer and to hold it in a predetermined fixed elevated position above the conveyer to permit the assembly function to be performed. As illustrated in FIG. 5, the positioning mechanism comprises mounting structure for mounting the positioning apparatus to the lower rail, including an elongated plate 148 having opposed generally U-shaped clamps 150 and 152 at opposite sides or ends thereof for extending over and clamping to opposite side edges of the lower rails 148. A vertical mounting plate 154 is secured to the end of the rail clamp, and includes an actuating cylinder 156 mounted by brackets 158 and 160 thereto for supporting the cylinder, and a piston rod 162 extending vertically upward, and on which is mounted the lifting cradle comprising a horizontal plate 164 and vertical side plates 166 and 168 having positioning bores 170 or pins 172 at the upper surface thereof for engaging positioning bores in the pallet 98. The lateral or side plate members 166 and 168 extend to each side of the conveyer and engage, the lateral side edge portions of the pallet extending over the sides thereof for selectively positioning and holding the pallet and fixture thereon for an assembly function to be performed thereon.

As soon as the assembly function is completed at the station, the positioning mechanism releases or retracts the pallet, setting it back on the conveyer, permitting it to move on to the next station. Each station is similarly equipped with the positioning mechanism.

Any number of the station units may be mounted on any one of the modular units as space permits. In order to accommodate sufficient space and stations, modular units may be positioned together, as explained above, end to end with a direct connection thereof and a continuation of the conveyer around the respective sides thereof. A one-hundred eighty degree conveyer turn assembly (FIG. 1) may be mounted at the terminal ends of the modular unit to reverse or turn the conveyer around to extend along the opposite side of the support structure. Similarly, ninety degree turn units (FIG. 1) may be used to turn the conveyer to extend along the side of a modular unit extending at right angles to an adjacent unit.

The conveyer unit, as illustrated in the present system, is a continuous unit extending around the entire assembly structure. Details of the conveyer unit are not shown as any number of suitable units are available on the market that can be mounted on and combined with the assembly unit as described herein.

The assembly unit as described herein is designed primarily for assembly mechanism to be operated by compressed air, but can accommodate mechanisms operated by hydraulic and electrical systems. The tubular members 74 and 76 (FIGS. 2,3, and 5) form compressed air manifolds with suitable quick connect air hose couplings (not shown) for each of the assembly stations. Suitable couplings or connectors 174 and 176 (FIG. 3) are also provided to a suitable source of compressed air and to adjacent manifolds. The two manifolds would be connected to the existing factory source of compressed air of 100-200 psi through suitable regulators to provide different pressures of 30-40 and 60-80 psi for example in the two manifolds.

From the above description, it is seen that we have provided a modular unit of a manufacturing assembly system for forming assembly systems having a selected number of assembly or work stations In operation,.one or more modular units are selected to accommodate a number of work stations required and to enable the required stations or spacings between the work stations. The modular units are fit together in a manner to accommodate or be accommodated within the space available or around existing assembly or manufacturing equipment. For example, other equipment may be adjacent the present assembly line to provide partially assembled sub-assemblies for the final product. Similarly, the assembly line may be arranged around manufacturing equipment, such as molding equipment, that is in the process of making the parts that go into the system. In one embodiment of the present system for example, parts are manufactured at certain stations along the assembly apparatus.

The system is set up in its desired configuration, and each assembly station is then configured for its particular operation. A series of pallets are selected, and the appropriate fixtures mounted thereon for accommodating the particular item of manufacture. A beginning station of the assembly process and a final station is determined, and the appropriate station apparatus assembled. The stations are appropriately equipped with the necessary pallet stop and sensing units and the necessary positioning units to position the work piece for the manufacturing operation.

By use of the appropriate sensing mechanisms, a number of different units may be assembled on the same assembly line. For example, sprinkler units having many different orifices may be manufactured on the same assembly line, with for example an option of three different orifices provided by three different orifice assembly stations. The pallets for one particular orifice would be identified by one trigger mechanism, whereas a different orifice would be identified by another trigger mechanism. When the pallet approaches an orifice station if that station and the sprinkler unit is matched, the pallet will be stopped and the orifice mounted in that sprinkler unit. However, should the sprinkler unit not require that orifice, the pallet will be permitted to pass that station and will be stopped by the appropriate assembly station.

In a similar manner, other modifications may be similarly manufactured on a continuous basis. In this manner, the same assembly line can be set up to simultaneously manufacture a number of different variations of the same article of manufacture. It is only necessary that the article to be manufactured be matched through its pallet or some sensing means to the appropriate assembly or manufacturing station.

While we have illustrated and described our invention by means of a specific embodiment, it is to be understood that numerous changes and modifications may be made therein without departing from the spirit and scope of the invention as defined in the appended claims.

We claim:

1. A modular assembly line unit for a system for carrying out multiple manufacturing and/or assembly operations, comprising:
   an elongated support structure comprising a plurality of vertically extending legs, a plurality of elongated horizontally extending tubular combination support and manifold members supported on said legs and defining means for providing at least two sources of pressurized fluid, and a plurality of horizontally extending mounting rails mounted on said tubular support members;
   conveyor means extending along opposite sides of said support structure for transporting articles of manufacture therealong;
   work piece carrying means releasably carried on said conveyor means; and
   means for establishing a plurality of work stations along said support structure, including first means for selecting a work piece from said conveyor means, second means for positioning said work piece for enabling an operation to be performed on said work piece; and
   means for transferring a pressurized fluid between the manifold members and at least one workstation to operate the workstation.

2. A modular unit according to claim 1 wherein:
   said elongated tubular members are generally square in cross-sectional configuration.

3. A modular unit according to claim 1 wherein:
   said elongated tubular members are disposed in a vertical array.

4. A modular unit system according to claim 1 wherein:
   said plurality of mounting rails comprises an upper rail and a lower rail.

5. A modular unit system according to claim 4 wherein:
   said upper rail comprises an elongated rectangular plate mounted on the top of said tubular members and extending outward on each side thereof.

6. A modular unit system according to claim 4 wherein:
   said lower rail comprises an elongated generally rectangular plate extending outward on each side of said tubular members.

7. A modular unit system according to claim 3 wherein:
said plurality of mounting rails comprises an upper rail and a lower rail.

8. A modular unit system according to claim 7 wherein:
said upper rail comprises an elongated rectangular plate mounted on the top of said tubular members and extending outward on each side thereof.

9. A modular unit system according to claim 8 wherein:
said lower rail comprises an elongated generally rectangular plate mounted below and extending outward on each side of said tubular members.

10. In a modular multi-station assembly system comprising:
elongated support means including a plurality of support legs, a pair of horizontal tubular support beam members defining separate fluid pressure chambers, an upper and a lower support rail for mounting assembly station mechanism, said support rails mounted on said tubular support beam members;
continuous conveyer means extending along said support structure;
a plurality of pallets for supporting work pieces on said conveyer means;
a plurality of deceleration and stop means on said support means for selectively decelerating and stopping selected ones of said pallets; and
positioning means on said support structure for selectively positioning selected ones of said pallets for operations on a work piece carried by said pallet; and
means for transferring a pressurized fluid between the fluid pressure chambers and at least one workstation to operate the workstation.

11. An assembly system according to claim 10 wherein:
said tubular beam members are positioned in a vertical array; and
said conveyer means extends along each side thereof.

12. An assembly system according to claim 11 wherein:
said upper support rail comprises an elongated rectangular plate mounted on a top of said beam members and extending to each side thereof for defining a combination of support table and a rail on each side thereof.

13. An assembly system according to claim 12 wherein:
said tubular beam members are generally square in cross sectional configuration.

14. An assembly system according to claim 10 wherein:
said deceleration and stop means comprises a base member for mounting on upper support rail;
a telescoping arm pivotally mounted on said base for extending at least partially onto said conveyer means; and
spring means for normally biasing said arm to an advanced position on said conveyer.

15. An assembly system according to claim 10 wherein:
said positioning means comprises a bas member for mounting on said lower support rail;
a vertically reciprocable support member mounted on said base for engaging lateral side edges of a pallet for lifting and supporting said pallet above said conveyer; and
linear motor means for reciprocating said support member.

16. A modular unit for carrying out multiple assembly operations, comprising:
elongated support means including a plurality of support legs, a pair of elongated horizontal tubular beam members defining separate fluid pressure chambers, an upper rectangular plate mounted on the top of said tubular beam members for defining upper support table and mounting rails and a lower rectangular plate mounted on the bottom of said tubular beam members for defining lower mounting rails for mounting assembly station mechanisms;
continuous conveyer means extending along opposite sides of said support structure at a position between said upper and said lower mounting rails;
a plurality of pallets for supporting work pieces on said conveyer means;
a plurality of deceleration and stop means on said support means for selectively decelerating and stopping selected ones of said pallets; and
positioning means on said support structure for selectively lifting and positioning selected ones of said pallets above said conveyer means for enabling operations on a work piece carried by said pallet; and
means for transferring a pressurized fluid between the fluid pressure chambers and at least one workstation to operate the workstation.

17. An assembly system according to claim 16 wherein:
said deceleration and stop means comprises a base member for mounting on said upper support rail;
a telescoping arm pivotally mounted on said base for extending at least partially onto said conveyer means;
means for telescopically extending and telescopically retracting said arm; and
spring means for normally biasing said arm to an advanced position on said conveyer.

18. An assembly system according to claim 17 wherein:
said positioning means comprises a base member for mounting on said lower support rail;
a vertically reciprocable support member mounted on said base for engaging lateral side edges of a pallet for lifting and supporting said pallet above said conveyer; and
linear motor means for reciprocating said support member.

19. An elongated modular support unit for a system for carrying out multiple manufacturing and/or assembly operations, comprising in combination:
a plurality of vertically extending legs;
a plurality of elongated horizontally extending tubular combination support and manifold members supported on said legs and defining means for providing at least two sources of pressurized fluid along the length of said support unit; and
a plurality of horizontally extending mounting rails mounted on and extending parallel to said tubular support and manifold members; and
means for transferring a pressurized fluid between the manifold members and at least one workstation to operate the workstation.

20. An assembly system according to claim 19 wherein:
said tubular beam members are generally square in cross-sectional configuration and are positioned in a vertical array;
said support rails comprise upper support rails which comprise an elongated rectangular plate mounted on a top of said beam members and extending to each side thereof for defining a combination of support table and a rail on each side thereof; and
a lower rectangular plate mounted below said tubular beam members for defining lower mounting rails for mounting assembly station mechanisms.

* * * * *